(12) United States Patent
Shah et al.

(10) Patent No.: US 11,301,878 B2
(45) Date of Patent: Apr. 12, 2022

(54) PEER-GROUP BASED BUSINESS INFORMATION SYSTEM

(71) Applicant: Databook Labs Inc., Palo Alto, CA (US)

(72) Inventors: Anand Shah, Palo Alto, CA (US); Alex Jones, London (GB)

(73) Assignee: Databook Labs Inc., Palo Alto, CA (US)

( * ) Notice: Subject to any disclaimer, the term of this patent is extended or adjusted under 35 U.S.C. 154(b) by 607 days.

(21) Appl. No.: 15/611,450

(22) Filed: Jun. 1, 2017

(65) Prior Publication Data

US 2018/0349924 A1 Dec. 6, 2018

(51) Int. Cl.
*G06Q 30/02* (2012.01)
*G06Q 10/06* (2012.01)

(52) U.S. Cl.
CPC ..... *G06Q 30/0201* (2013.01); *G06Q 10/0639* (2013.01)

(58) Field of Classification Search
CPC .................. G06Q 30/0201; G06Q 10/0639
See application file for complete search history.

(56) References Cited

U.S. PATENT DOCUMENTS

| | | | | |
|---|---|---|---|---|
| 8,626,544 | B2 * | 1/2014 | An | G06Q 99/00 705/7.12 |
| 2008/0103872 | A1 * | 5/2008 | Mount | G06Q 30/0205 705/7.34 |
| 2016/0321705 | A1 * | 11/2016 | Scheidelman | G06F 17/27 |
| 2017/0098002 | A1 * | 4/2017 | Byrnes | H04L 67/2819 |
| 2017/0243150 | A1 * | 8/2017 | Dave | G06Q 10/067 |

FOREIGN PATENT DOCUMENTS

| | | | | |
|---|---|---|---|---|
| CA | 2665142 A1 * | 4/2008 | | G06Q 30/0201 |
| EP | 3255592 A1 * | 12/2017 | | G06Q 30/02 |

OTHER PUBLICATIONS

Banks et al, Data Mining in Electronic Commerce, 2006 (Year: 2006).*

* cited by examiner

*Primary Examiner* — Mohamed N El-Bathy
(74) *Attorney, Agent, or Firm* — Fox Rothschild LLP

(57) ABSTRACT

Peer-group based business information can include: generating a set of curated market information for each of a set of business entities such that each set of curated market information enables a determination of one or more markets in which the corresponding business entity currently operates; selecting a subset of the business entities for inclusion in a peer-group cluster in response to the curated market information such that the business entities specified in the peer-group cluster share at least one competitive overlap in one or more of the markets; and providing a user with a relative comparison of the business entities specified in the peer-group cluster.

7 Claims, 13 Drawing Sheets

PEER-GROUP BASED BUSINESS INFORMATION SYSTEM

BACKGROUND

Online resources can provide information about corporations and other types of business entities. For example, an official website of a public corporation can provide information about its products, its services, the markets it serves, financial reports, sales reports, press releases, etc. News web sites, e.g., business news sites, financial news sites, can publish news stories about the products, services, markets, sales, finances, etc., of business entities.

SUMMARY

In general, in one aspect, the invention relates to a peer-group based business information system. The system can include: a data store holding a set of curated market information for each of a set of business entities, each set of curated market information selected to enable a determination of one or more markets in which the corresponding business entity currently operates; a peer-group analyzer for selecting a subset of the business entities for inclusion in a peer-group cluster in response to the curated market information such that the business entities specified in the peer-group cluster share at least one competitive overlap in one or more of the markets; and a performance ranker for providing a user with a relative comparison of the business entities specified in the peer-group cluster.

In general, in another aspect, the invention relates to a method for peer-group based business information. The method can include: generating a set of curated market information for each of a set of business entities such that each set of curated market information enables a determination of one or more markets in which the corresponding business entity currently operates; selecting a subset of the business entities for inclusion in a peer-group cluster in response to the curated market information such that the business entities specified in the peer-group cluster share at least one competitive overlap in one or more of the markets; and providing a user with a relative comparison of the business entities specified in the peer-group cluster.

Other aspects of the invention will be apparent from the following description and the appended claims.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION

Figure 1:
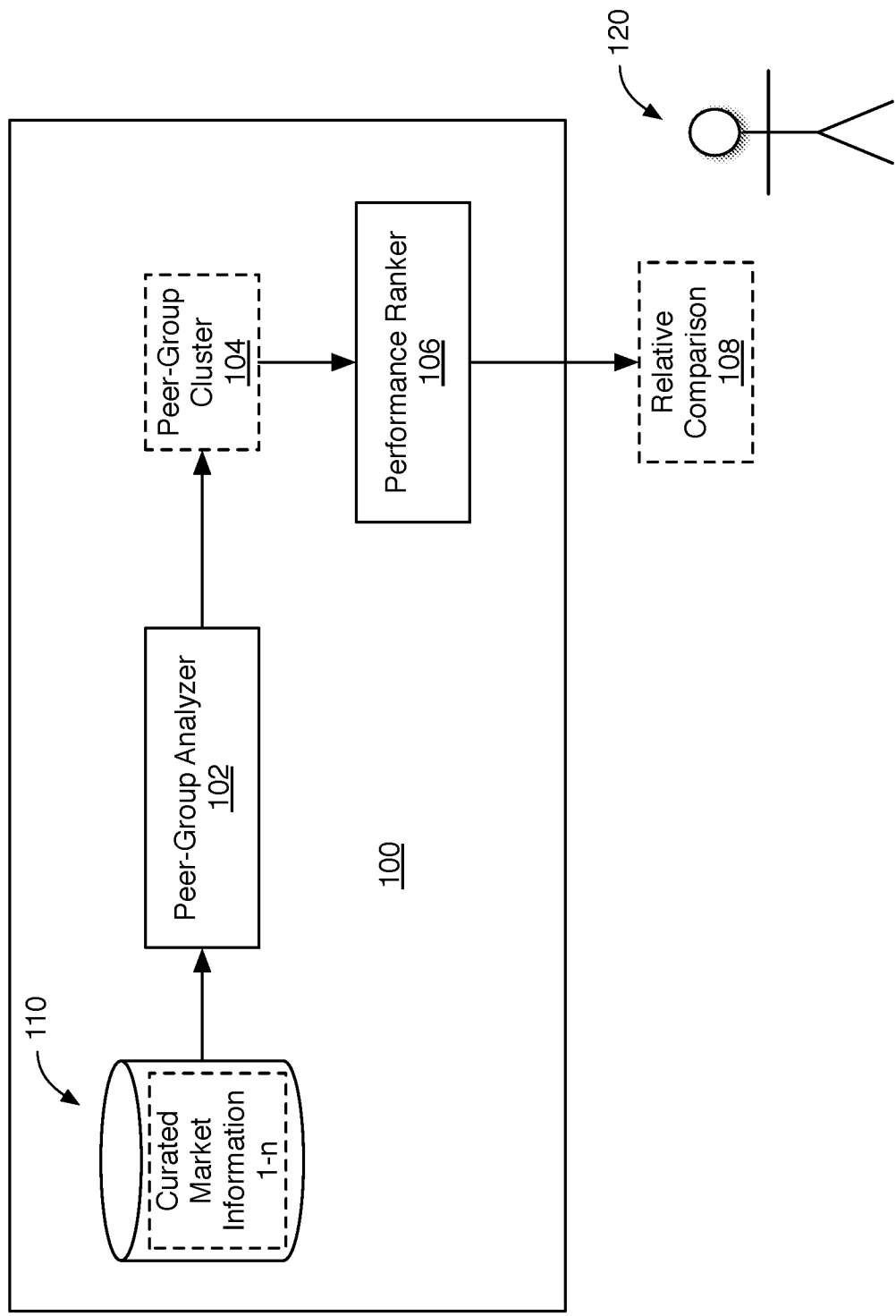
FIG. 1 illustrates a peer-group based business information system in one or more embodiments.

Reference will now be made in detail to the various embodiments of the present disclosure, examples of which are illustrated in the accompanying drawings. Like elements in the various figures are denoted by like reference numerals for consistency. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, have not been described in detail so as not to unnecessarily obscure aspects of the present disclosure.

FIG. 1 illustrates a peer-group based business information system 100 in one or more embodiments. The peer-group based business information system 100 includes a data store 110 for holding multiple sets of curated market information 1-n. Each set of curated market information 1-n pertains to a corresponding business entity 1-n. The curated market information 1-n enables a determination of in which markets the corresponding business entities 1-n currently operate.

The curated market information 1-n can include any information that can be used to determine in which markets the corresponding business entities 1-n currently operate. For example, the curated market information 1-n can specify deliverables provided by the corresponding business entities 1-n, e.g., consumer products, consumer services, business products, business services, etc. The curated market information 1-n can specify geographic regions, jurisdictions, etc., in which the respective business entities 1-n provide those deliverables. The curated market information 1-n can specify categories that distinguish similar deliverables in different market strata, e.g., luxury consumer products versus low-cost consumer products, etc.

The peer-group based business information system 100 includes a peer-group analyzer 102 for selecting a subset of the business entities 1-n for inclusion in a peer-group cluster 104 in response to the curated market information 1-n. In one or more embodiments, the peer-group analyzer 102 selects the business entities 1-n for inclusion in the peer-group cluster 104 by determining at least one competitive overlap in one or more of the markets in which the business entities 1-n currently operate.

Figure 2:
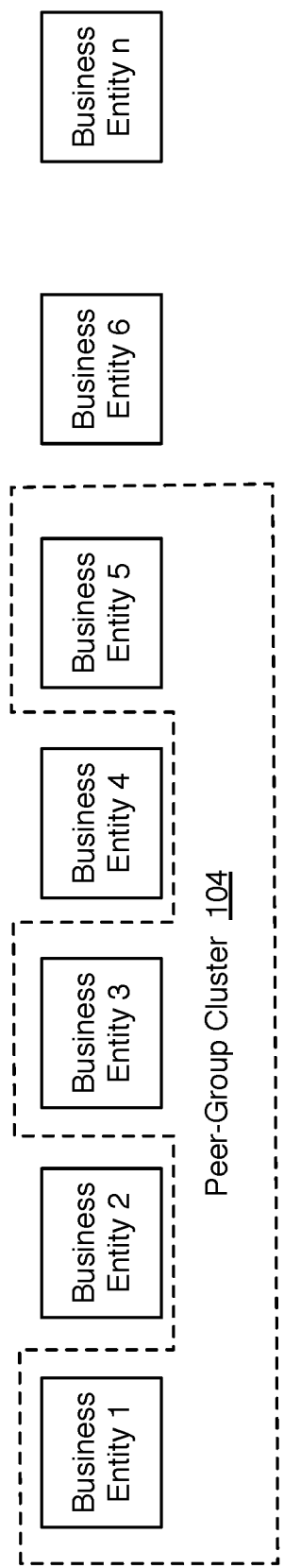
FIG. 2 depicts a set of business entities characterized by a set of curated market information.

FIG. 2 schematically shows the business entities 1-n represented by the curated market information 1-n. The business entities 1-n can include business entities that provide goods to consumers via retail outlets, e.g., online retail, brick-and-mortar stores, etc. The business entities 1-n can include business entities that provide services to consumers e.g., online services, services via brick-and-mortar facilities, etc. The business entities 1-n can include business entities that provide goods to businesses via wholesale/supply outlets, e.g., online suppliers, warehouses, etc. The business entities 1-n can include business entities that provide services to business. The business entities 1-n can include business entities that provide any combination of goods, services to consumers and businesses.

The business entities 1-n can include business entities that are segments, subdivisions, subsidiaries, joint ventures, etc., of other business entities. Segments, subdivisions, subsidiaries, joint-ventures, etc., of other business entities can be based on particular products, services, or types of products or services e.g., a consumer products division of a larger business entity, a business services division of a larger business entity, etc. Segments, subdivisions, subsidiaries, joint ventures, etc., of other business entities can be based on geographic areas, jurisdictions, etc. For example, the business entities 1-n can include North American, Asian, and European divisions of a large multinational corporation.

The business entities 1-n can include projects, industries, countries, and individuals, etc. The business entities 1-n can include sub-industries which are part of industries. For example, Alcoholic Beverages, Food Products and Household Goods are often classified under the industry Consumer Goods and Services.

The business entities 1-n can include publicly traded corporations, e.g., companies traded on the New York Stock Exchange, the Nasdaq, the London Stock Exchange, Borse Frankfurt, Euronext, the Tokyo Stock Exchange, the Shanghai Stock Exchange, etc. The business entities 1-n can include subdivisions of publicly traded corporations. The business entities 1-n can include companies traded "over the counter". The business entities 1-n can include privately held companies.

In this example, the peer-group analyzer 102 selects the business entities 1, 3, and 5 for inclusion in the peer-group cluster 104 in response to the curated market information 1-n. Any one or more of the business entities 1, 3, and 5 selected for inclusion in the peer-group cluster 104 can be a subdivision, segment, etc., of a larger business entity, e.g., a large, perhaps multinational, corporation.

For example, the curated market information 1 and the curated market information 3 and the curated market information 5 can indicate that the business entities 1, 3, and 5 offer athletic footwear to U.S. consumers and so are included in the peer-group cluster 104, but the curated market information 2 can indicate that the business entity 2 does not offer athletic footwear, or offers athletic footwear outside of the U.S., or only to retailers, etc., and so is not selected for inclusion in the peer-group cluster 104.

Referring again to FIG. 1, the peer-group based business information system 100 includes a performance ranker 106 for providing a user 120 with a relative comparison 108 of the business entities 1-n specified in the peer-group cluster 104. For example, the performance ranker 106 can, via a user interface, depict the relative comparison 108 to the user 120 using text, graphics, audio, etc.

In one or more embodiments, the performance ranker 106 generates the relative comparison 108 in response from a request from the user 120 that identifies one or more of the business entities 1-n specified in the peer-group cluster 104. For example, the performance ranker 106 can obtain, via a user interface, a request from the user 120 that includes an identification of the business entity 1, determine that the business entity 1 is a member of the peer-group cluster 104, and in response provide the relative comparison 108 back to the user 120.

In one or more embodiments, the relative comparison 108 can indicate a performance of one or more of the business entities 1-n specified in the peer-group cluster 104 in the markets in which the business entities 1-n specified in the peer-group cluster 104 operate. Examples of market performance that can be depicted in the relative comparison 108 can include unit sales, profit margins, recurring revenues, same-store sales, earnings-per-share, net income, quarterly sales/revenue growth/decline, year-over-year sale/revenue growth/decline, etc.

Figure 3B:
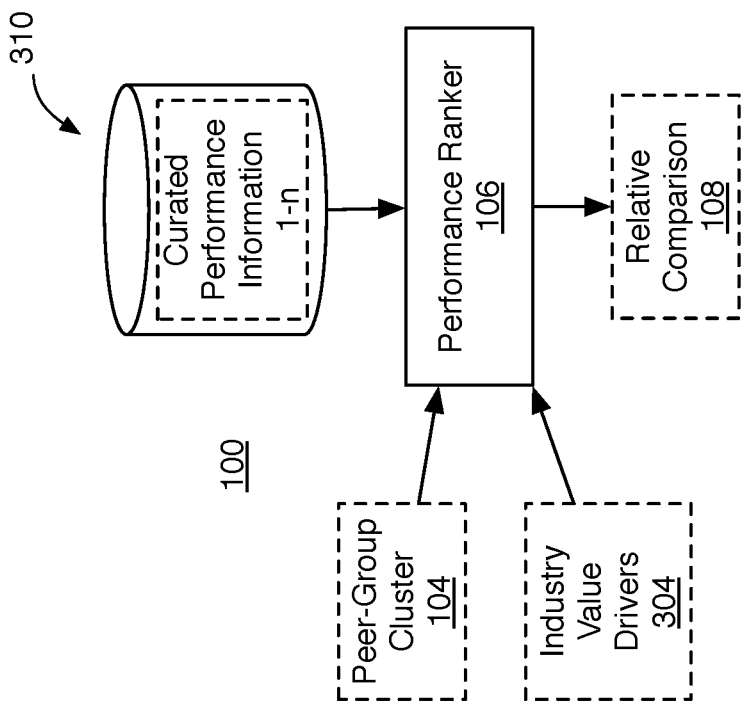
FIGS. 3A-3B illustrate embodiments of a peer-group based business information system that includes a data store for holding multiple sets of curated performance information.
Figure 3A:
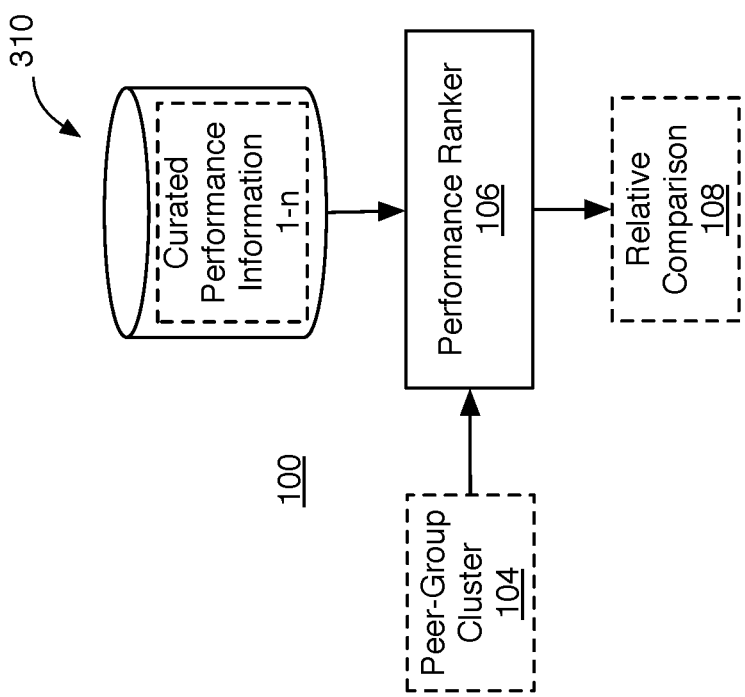

FIGS. 3A-3B illustrate embodiments of the peer-group based business information system 100 that includes a data store 310 for holding multiple sets of curated performance information 1-n. Each set of curated performance information 1-n pertains to a corresponding one of the business entities 1-n. The curated performance information 1-n enables a determination of the performances of the business entities 1-n. The performance ranker 106 in one or more embodiments determines a relative performance rank for each of the business entities 1-n specified in the peer-group cluster 104 in response to the curated performance information 1-n.

The curated performance information 1-n can include any information that can be used to determine a performance of the business entities 1-n. For example, the curated performance information 1-n can include unit sales, profit margins, recurring revenues, same-store sales, earnings-per-share, net income, quarterly sales/revenue growth/decline, year-over-year sale/revenue growth/decline, etc.

For example, the performance ranker 106 can determine a performance for each of the business entities 1, 3, and 5, of the peer group 104 by obtaining the profit margin figures specified in the curated performance information 1, 3, and 5, and ranking the business entities 1, 3, and 5 from highest to lowest profit margins. In another example, the performance ranker 106 can determine a performance for the business entities 1, 3, and 5, of the peer-group cluster 104 by obtaining the unit sales figures specified in the curated performance information 1, 3, and 5, and ranking the business entities 1, 3, and 5 from highest to lowest in unit sales.

In the embodiment of FIG. 3B, the performance ranker 106 determines the relative comparison 108 in response to a set of industry value drivers 304. The peer-group analyzer 102 can assign the industry value drivers 304 to the peer-group cluster 104. The industry value drivers 304 identify one or more performance measures that are known to drive the value of the business entities 1-n identified in the peer-group 104.

For example, if the peer-group cluster 104 identifies a set of sports equipment brick-and-mortar retailers, the industry value drivers 304 can specify same store sales as the performance measure upon which the performance ranker 106 is to base the relative comparison 108. In another example, if the peer-group cluster 104 identifies a set of tech startups, the industry value drivers 304 can specify revenue growth as the performance measure upon which the performance ranker 106 is to base the relative comparison 108.

Figure 4:
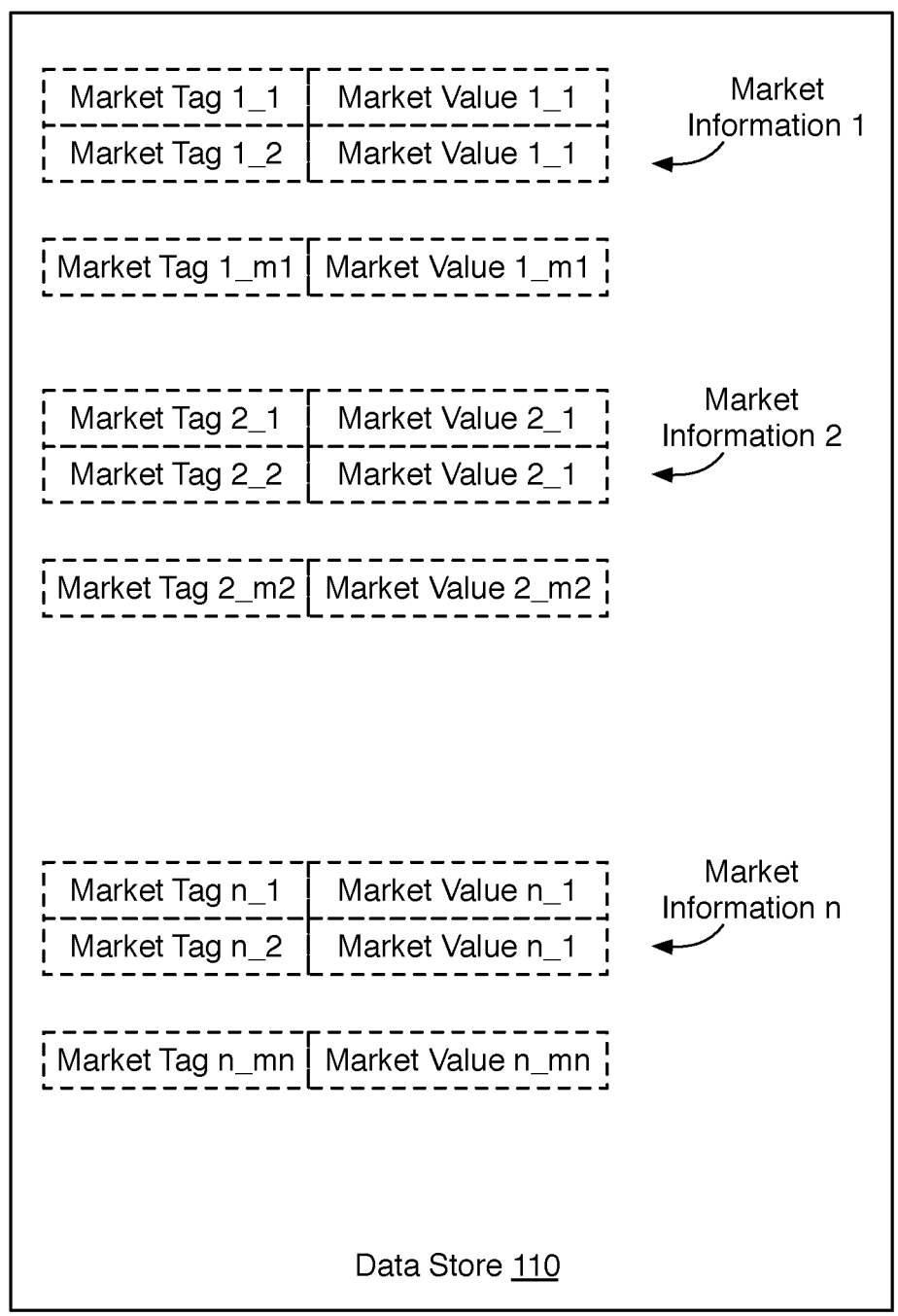
FIG. 4 illustrates a set of curated market information in one or more embodiments.

FIG. 4 illustrates the curated market information 1-n in the data store 110 of the peer-group based business information system 100 in one or more embodiments. Each set of curated market information 1-n can include a set of tag/value pairs. For example, the curated market information 1 includes a set of m1 tag/value pairs (market tag 1_1/market value 1_1 through market tag 1_m1/market value 1_m1) that can be used to determine in which markets the business entity 1 currently operates.

The tags in the tag/value pairs in the curated market information 1-n can enable the peer-group analyzer 102 to perform apples to apples comparisons when evaluating the business entities 1-n for inclusion in the peer-group cluster 104. Examples of tags in the tag/value pairs in the curated market information 1-n include tags for consumer products, tags for services to consumers, tags for business products, tags for business services, etc. Tags can include geographic, jurisdictional limitations.

The peer-group analyzer 102 can determine a competitive overlap involving the business entities 1-n by matching the market values of comparable tags in the curated market information 1-n. For example, the peer-group analyzer 102 can determine a competitive overlap involving the business entities 1 and 2 by matching the market values of comparable tags in the curated market information 1 and 2. Likewise, the peer-group analyzer 102 can determine a competitive overlap involving the business entities 1 and 3 by matching the market values of comparable tags in the curated market information 1 and 3. For example, a competitive overlap involving the business entities 1 and 3 can be indicated if the market tag 1_1/market value 1_1 pair is "U.S. consumer products/athletic footwear" and the market tag 3_2/market value 3_2 pair is "North America consumer products/athletic footwear".

Figure 5:
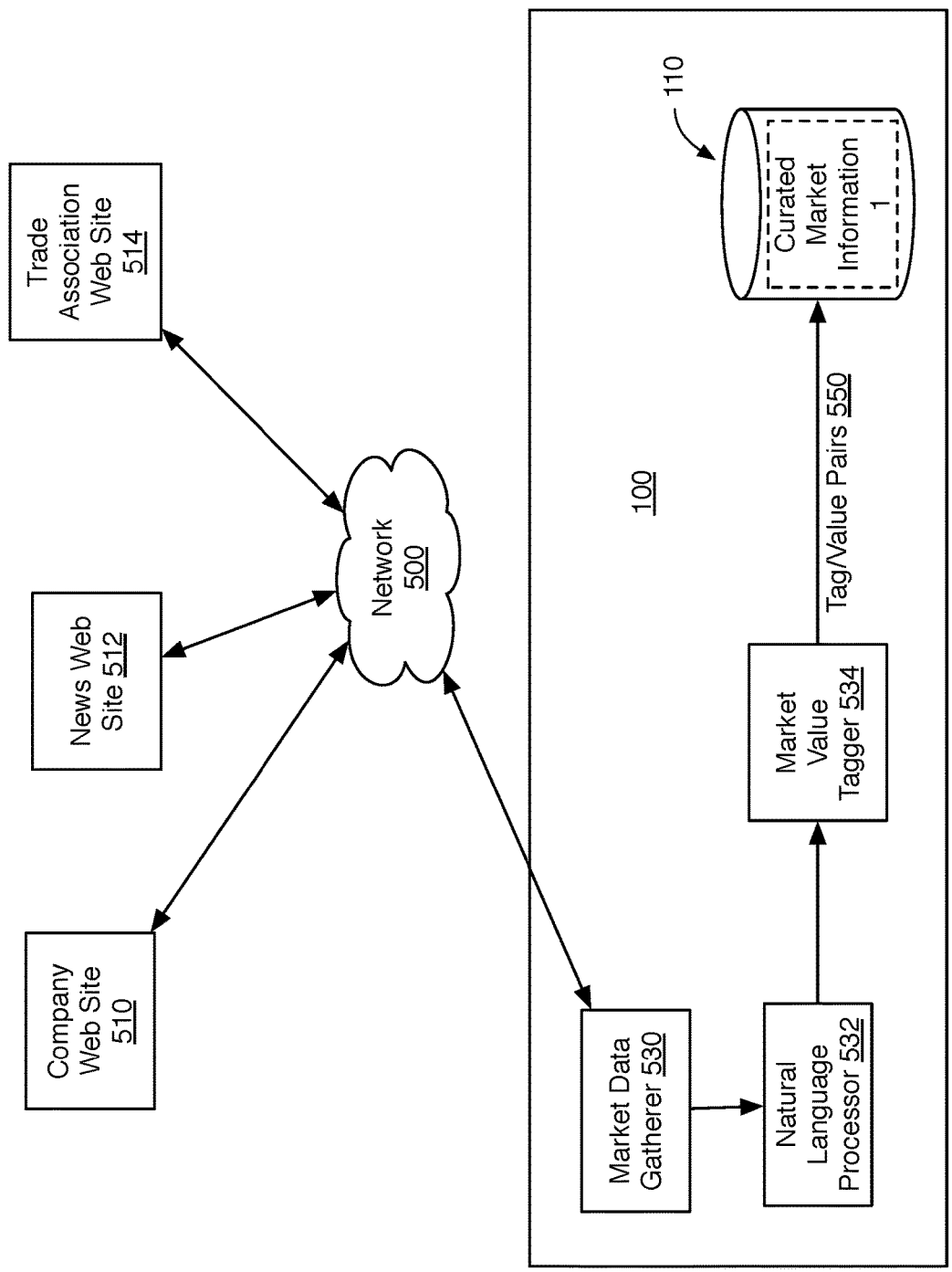
FIG. 5 illustrates how a peer-group based business information system can generate a set of tag/value pairs in a set of curated market information in one or more embodiments.

FIG. 5 illustrates how the peer-group based business information system 100 can generate a set of tag/value pairs of the curated market information 1-n in one or more embodiments. In this example, a set of tag/value pairs 550 are generated for the curated market information 1 of the business entity 1.

The peer-group based business information system 100 includes a market data gatherer 530 that gathers market information pertaining to the business entity 1 from a variety of online resources via a network 500, e.g., from a company web site 510 of the business entity 1, a news web site 512, and a trade association web site 514. For example, the company web site 510 can be an official web site of the business entity 1. The news web site 512 can be a business news site that publishes news stories pertaining to a variety of business entities including the business entity 1. The trade association web site 514 can be an official site of a trade association in which the business entity 1 is a member.

The peer-group based business information system 100 includes a natural language processor 532 for extracting market values that pertain to the markets in which the business entity 1 participates from the online publications, stories, announcements, etc., obtained by the market data gatherer 530. The peer-group based business information system 100 includes a market value tagger 534 for tagging the market values extracted by the natural language processor 532. The tags generated by the market value tagger 534 can be selected to enable a comparison by the peer-group analyzer 102 of the market values extracted by the natural language processor 532.

For example, if the market data gatherer 530 obtains the following text pertaining to business entity 1 (XYZ Corporation) from the company web site 510—"XYZ Corporation is the leading retailer of athletic footwear in the U.S., Europe, and Asia"—the natural language processor 532 can recognize the sentence object "athletic footwear" as a market value for the tag/value pairs 550. The natural language processor 532 can recognize the adjective "retailer" and the market value tagger 534 can in response tag the market value "athletic footwear" with a consumer products tag. The natural language processor 532 can recognize the nouns "U.S." and "Europe" and "Asia" in the prepositional phrase "in the U.S., Europe, and Asia" and the market value tagger 534 can in response tag the market value "athletic footwear" with "U.S." and "Europe" and "Asia" geographical tags.

Figure 6:
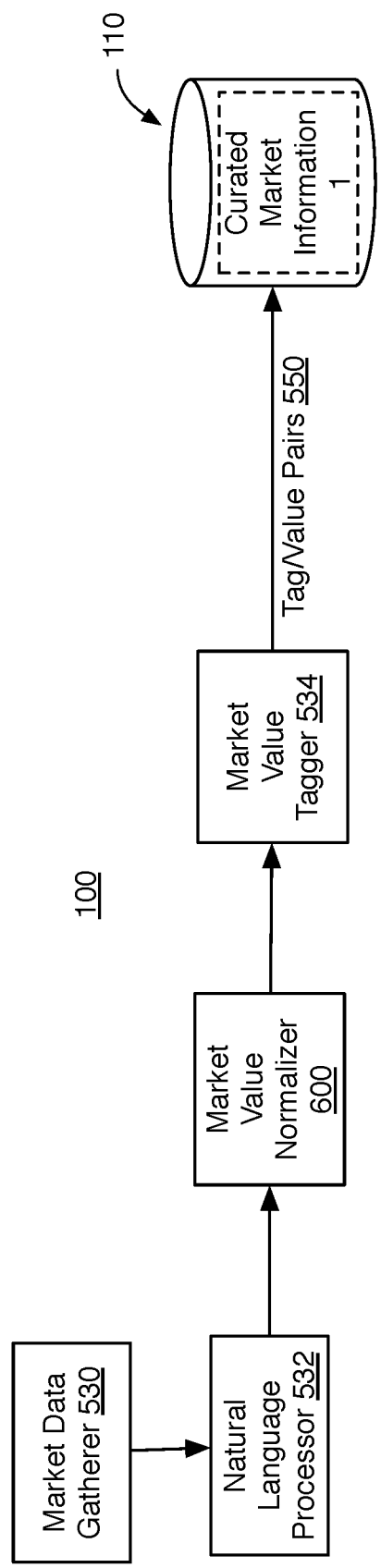
FIG. 6 shows a market value normalizer in one or more embodiments of a peer-group based business information system.

FIG. 6 shows a market value normalizer 600 in one or more embodiments of the peer-group based business information system 100. The market value normalizer 600 normalizes market values obtained by the natural language processor 532 to facilitate determining the competitive overlap by the peer-group analyzer 102 because different wordings of market values can actually refer to the same thing. For example, "athletic footwear" and "athletic shoes" and "sports shoes" can refer to the same products. The market value normalizer 600 can normalize "athletic shoes" and "sports shoes" to "athletic footwear" for tagging by the market value tagger 534.

Figure 7:
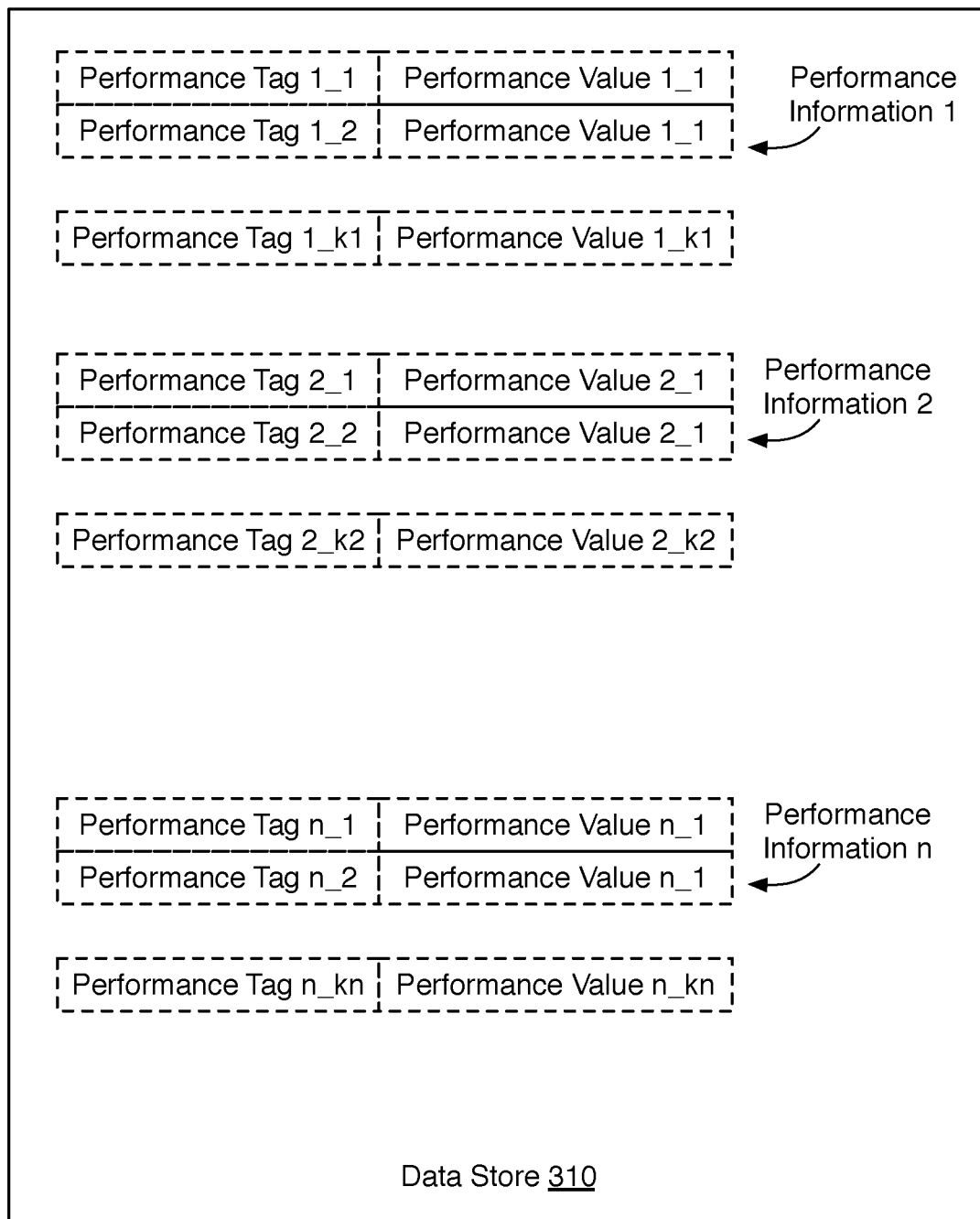
FIG. 7 illustrates a set of curated performance information in one or more embodiments.

FIG. 7 illustrates the curated performance information 1-n in the data store 310 of the peer-group based business information system 100 in one or more embodiments. Each set of curated performance information 1-n can include a set of tag/value pairs. For example, the curated performance information includes a set of k1 tag/value pairs (performance tag 1_1/performance value 1_1 through performance tag 1_k1/performance value 1_k1) that can be used to determine a performance for the business entity 1.

The tags in the tag/value pairs in the curated performance information 1-n can enable the performance ranker 106 to perform apples to apples comparisons when determining the relative performances of the business entities 1-n specified in the peer-group cluster 104. Examples of tags in the tag/value pairs in the curated performance information 1-n include unit sales, profit margins, recurring revenues, same-store sales, earnings-per-share, net income, quarterly sales/revenue growth/decline, year-over-year sale/revenue growth/decline, etc.

Figure 8:
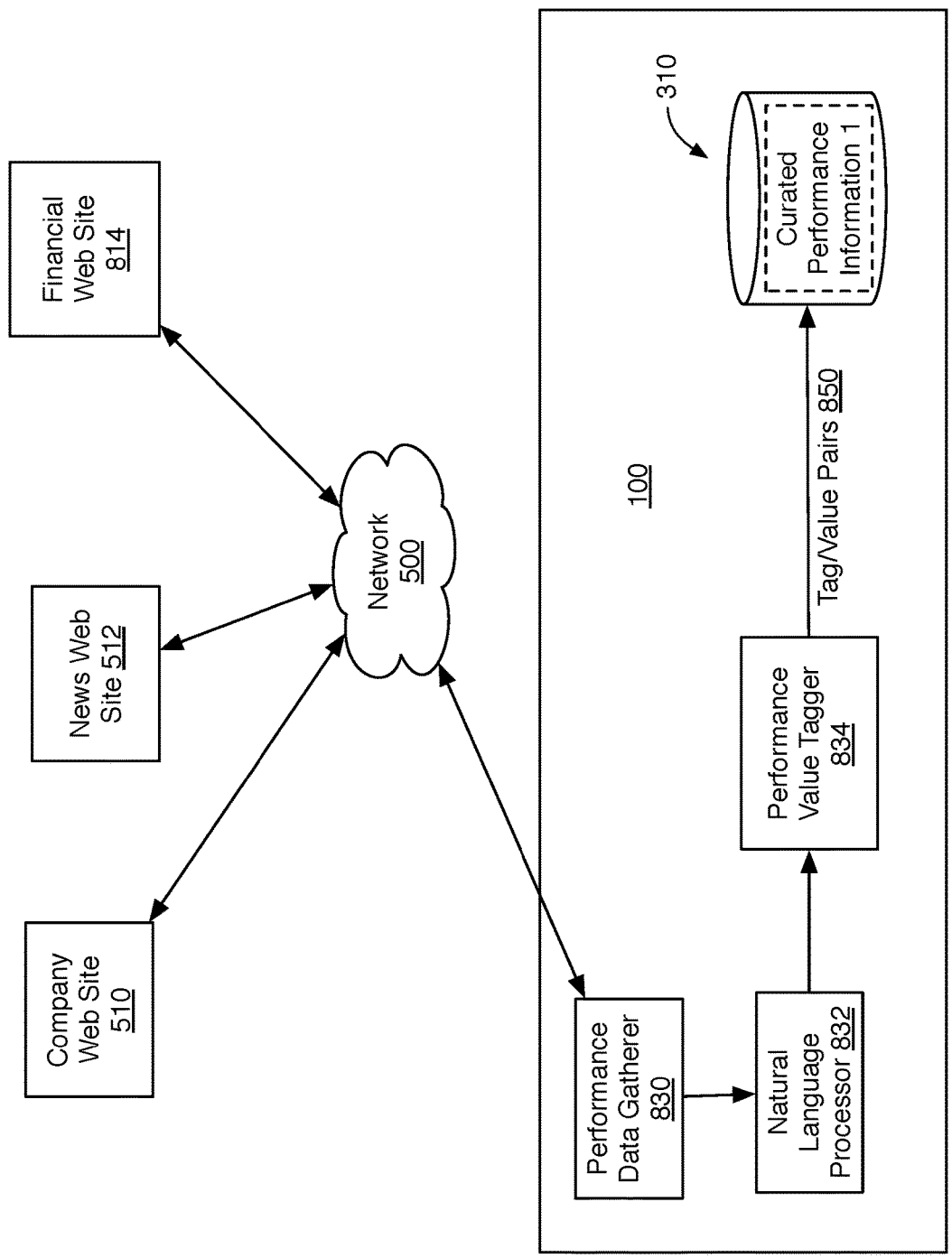
FIG. 8 illustrates how a peer-group based business information system can generate a set of tag/value pairs in a set of curated performance information in one or more embodiments.

FIG. 8 illustrates how the peer-group based business information system 100 can generate a set of tag/value pairs of the curated performance information 1-n in one or more embodiments. In this example, a set of tag/value pairs 850 are generated for the curated performance information 1 of the business entity 1.

The peer-group based business information system 100 includes a performance data gatherer 830 that gathers performance information pertaining to the business entity 1 from a variety of online resources via the network 500. For example, the performance data gatherer 830 can gather quarterly reports, news stories, announcements, articles, etc., pertaining to the performance of the business entity 1 from the company web site 510, the news web site 512, and a financial web site 814.

The peer-group based business information system 100 includes a natural language processor 832 for extracting performance values that pertain to the performance of the business entity 1 from information obtained by the performance data gatherer 830. The peer-group based business information system 100 includes a performance value tagger 834 for tagging the performance values extracted by the natural language processor 832 to enable a comparison of the performance values by the performance ranker 106.

For example, if the performance data gatherer 830 obtains the text—"XYZ Corporation reported earnings of 68 cents per share for the fiscal third quarter on total sales of $8.43 billion"—from the news web site 512, the natural language processor 832 can recognize the performance value "68 cents per share" as an earnings-per-share performance value and the performance value tagger 834 can tag it with an earnings-per-share tag. The natural language processor 832 can recognize the performance value "$8.43 billion" as a revenue figure and the performance value tagger 834 can tag it with a revenue tag.

Figure 9:
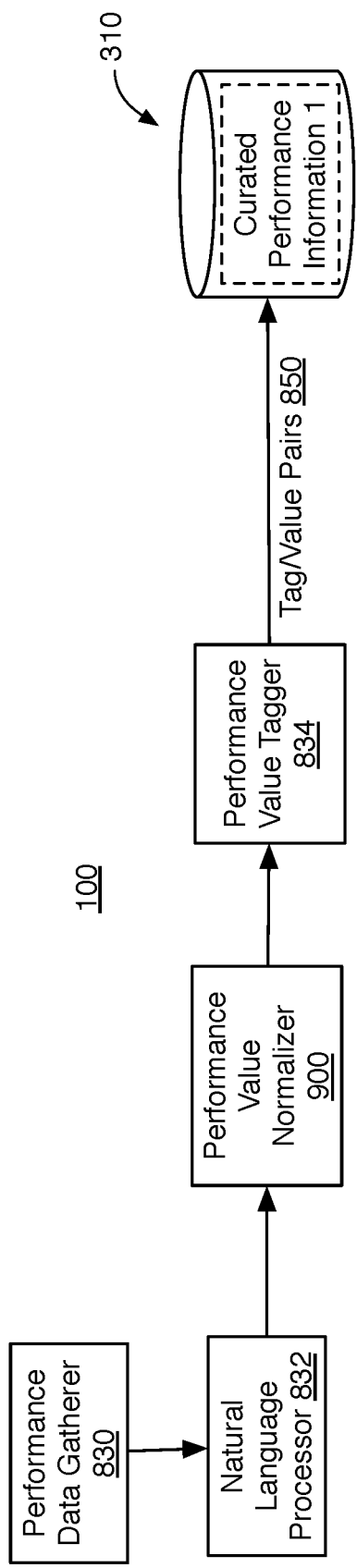
FIG. 9 shows a performance value normalizer in one or more embodiments of a peer-group based business information system.

FIG. 9 shows a performance value normalizer 900 in one or more embodiments of the peer-group based business information system 100. The performance value normalizer 900 normalizes performance values obtained by the natural language processor 832 to facilitate performance comparisons because different business entities can report performance information differently. For example, a carmaker based in the U.S. can report unit sales whereas a carmaker based in Europe can report new car registrations. The performance value normalizer 900 can normalize new car registrations performance values to unit sales performance values for tagging by the performance value tagger 834.

Figure 10:
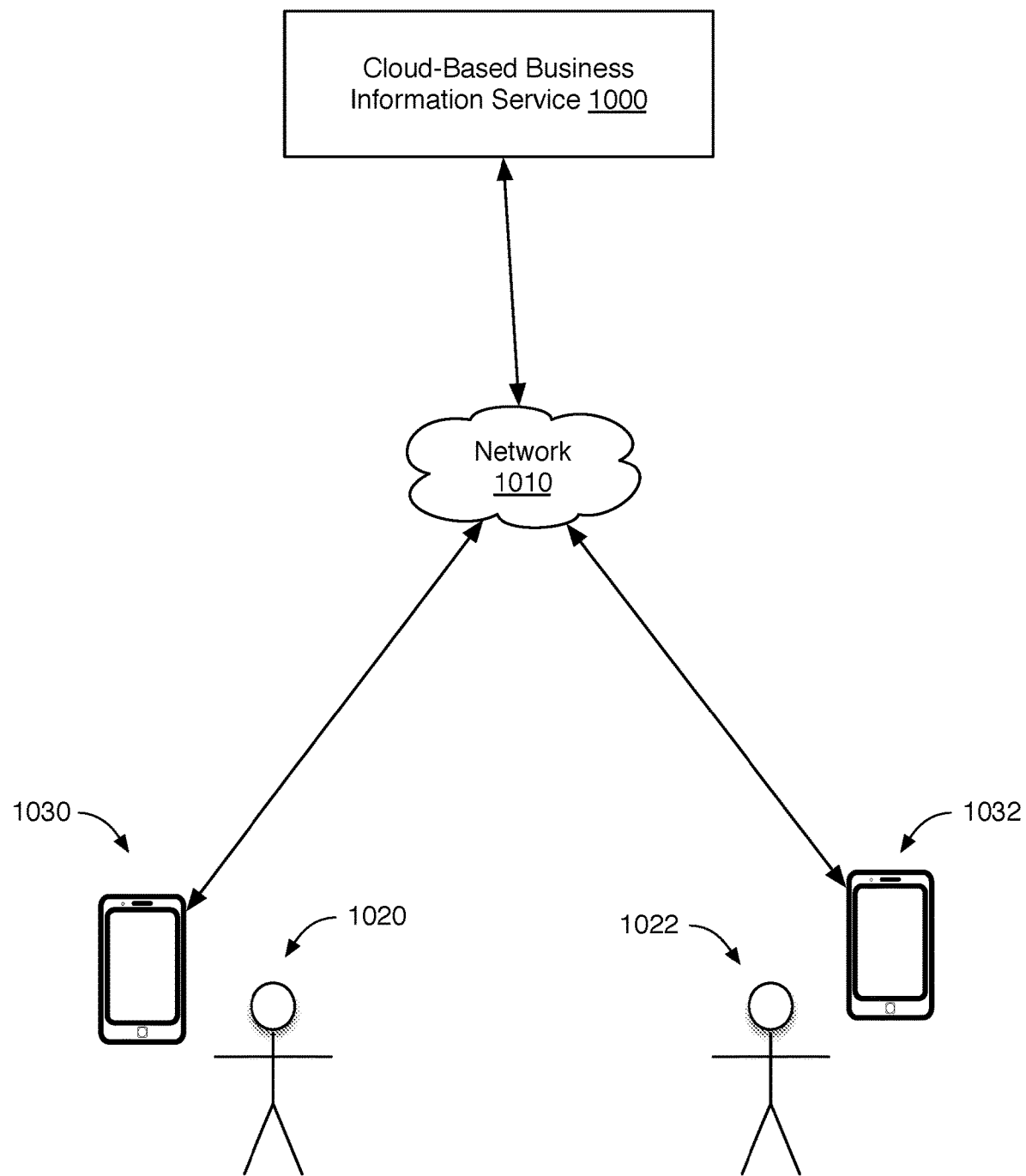
FIG. 10 shows a peer-group based business information system embodied in a cloud-based service accessible via a network.

FIG. 10 shows the peer-group based business information system 100 embodied in a cloud-based business information service 1000 accessible via a network 1010. For example, a user 1020 can access the cloud-based business information service 1000 using a mobile device 1030 and a user 1022 can access the cloud-based business information service 1000 using a mobile device 1032.

The mobile devices 1030-1032 can run mobile apps adapted for accessing the cloud-based business information service 1000 via the network 1010. For example, the user 1020 can use a mobile app on the mobile device 1030 to obtain a performance ranking of one or more of the business entities 1-n in the peer-group cluster 104. The mobile app on the mobile device 1030 can enable the user 1020 to enter the name of a business entity, enter search terms for a business entity, select a business entity from a list, etc. The mobile app on the mobile device 1030 provides the user 1020 with charts, graphs, text, animations, etc., depicting the relative performances of business entities in the peer-group cluster 104.

Figure 11:
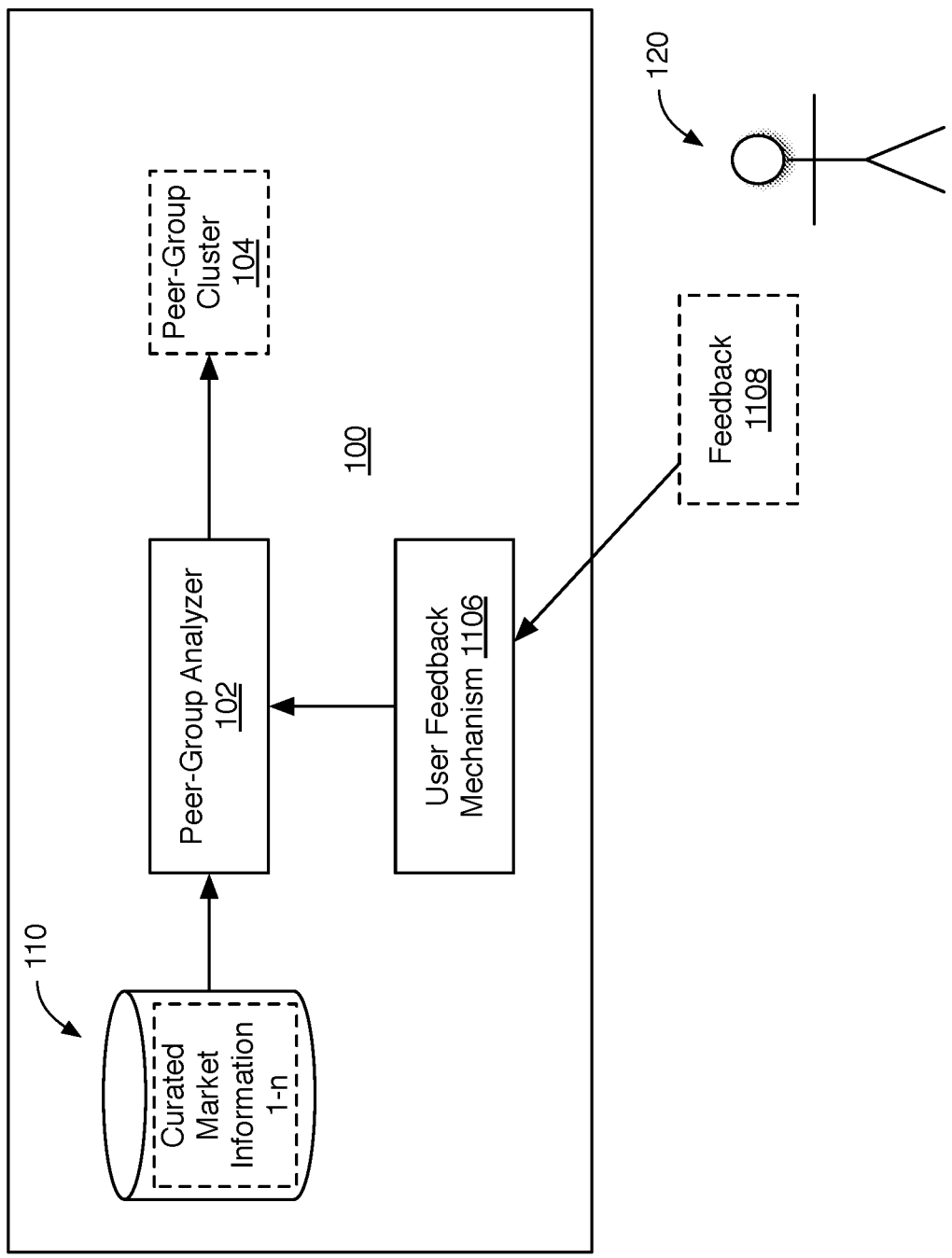
FIG. 11 shows a user feedback mechanism in one or more embodiments of a peer-group based business information system.

FIG. 11 illustrates a user feedback mechanism 1106 in one or more embodiments of the peer-group based business information system 100. The user feedback mechanism 1106 enables the user 120 to provide a feedback 1108 pertaining to one or more of the business entities 1-n identified in the peer-group cluster 104. In one or more embodiments, the peer-group analyzer 102 modifies the peer-group cluster 104 in response to the feedback 1108.

The feedback 1108 can indicate a disagreement by the user 120 with the inclusion of one or more of the business entities 1-n identified in the peer-group cluster 104. For example, the user 120 can possess special knowledge of the business entity 1, the products, services, industry trends, mergers and acquisitions, new business plans etc., in the corresponding industry etc., that indicate to the user 120 that the business entity 1 does not belong in the peer-group cluster 104. The peer-group analyzer 102 in response to the feedback 1108 indicating that the business entity 1 does not belong in the peer-group cluster 104 can remove the business entity 1 from the peer-group cluster 104.

The feedback 1108 can indicate a disagreement by the user 120 with the exclusion of one or more of the business entities 1-n identified in the curated market information 1-n from the peer-group cluster 104. For example, the user 120 can possess special knowledge of the business entity 6, the products, services, industry trends, mergers and acquisitions, etc., in the corresponding industry, new business plans, etc., that indicate to the user 120 that the business entity 6 does belong in the peer-group cluster 104. The peer-group analyzer 102 in response to the feedback 1108 indicating that the business entity 6 does belong in the peer-group cluster 104 can add the business entity 6 to the peer-group cluster 104.

In one or more embodiments, the peer-group analyzer 102 can filter the feedback 1108 using crowd-sourcing before applying changes to the peer-group cluster 104. For example, the peer-group analyzer 102 can add the business entity 6 to the peer-group cluster 104 if large numbers of users of the peer-group based business information system 100 indicate that the business entity 6 belongs in the peer-group cluster 104. Likewise, the peer-group analyzer 102 can remove the business entity 1 from the peer-group cluster 104 if large numbers of users indicate that the business entity 1 does not belong in the peer-group cluster 104.

The user feedback mechanism 1106 can obtain the feedback 1108 from the user 120 by generating user interface elements on a device, e.g., a laptop, smartphone, wearable, etc., of the user 120. For example, a display depicting the relative comparison 108 on a device of the user 120 can include user interface elements that enable the user 120 to provide feedback pertaining to the business entities 1-n depicted in the relative comparison 108. Likewise, a display depicting the relative comparison 108 on a device of the user 120 can include user interface elements that enable the user 120 to add additional ones of the business entities 1-n to be depicted in the relative comparison 108, e.g., by selecting additional ones of the business entities 1-n from a pulldown menu.

Figure 12:
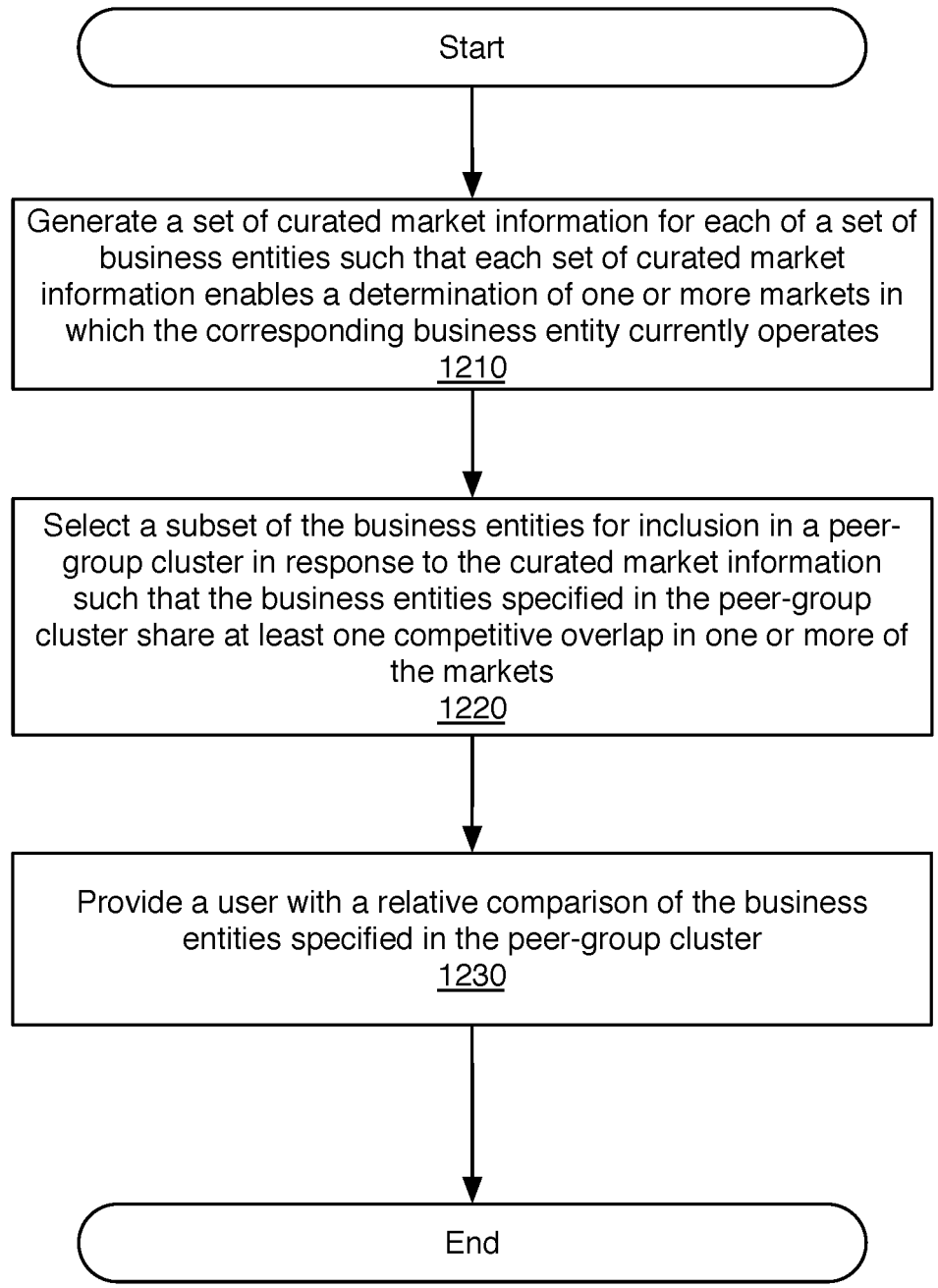
FIG. 12 illustrates a method for peer-group based business information in one or more embodiments.

FIG. 12 illustrates a method for peer-group based business information in one or more embodiments. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 12 should not be construed as limiting the scope of the invention.

At step 1210, a set of curated market information is generated for each of a set of business entities. Each set of curated market information enables a determination of one or more markets in which the corresponding business entity currently operates. The curated market information can be initially gathered from online resources, then normalized and tagged to facilitate the determination of the markets.

At step 1220, a subset of the business entities is selected for inclusion in a peer-group cluster in response to the curated market information. The business entities specified in the peer-group cluster can be selected to share at least one competitive overlap in one or more of the markets and enable apples-to-apples comparisons of business entities.

At step 1230, a user is provided with a relative comparison of the business entities specified in the peer-group cluster. The relative comparison can indicate a relative performance of each of the business entities specified in the peer-group cluster in market terms.

Figure 13:
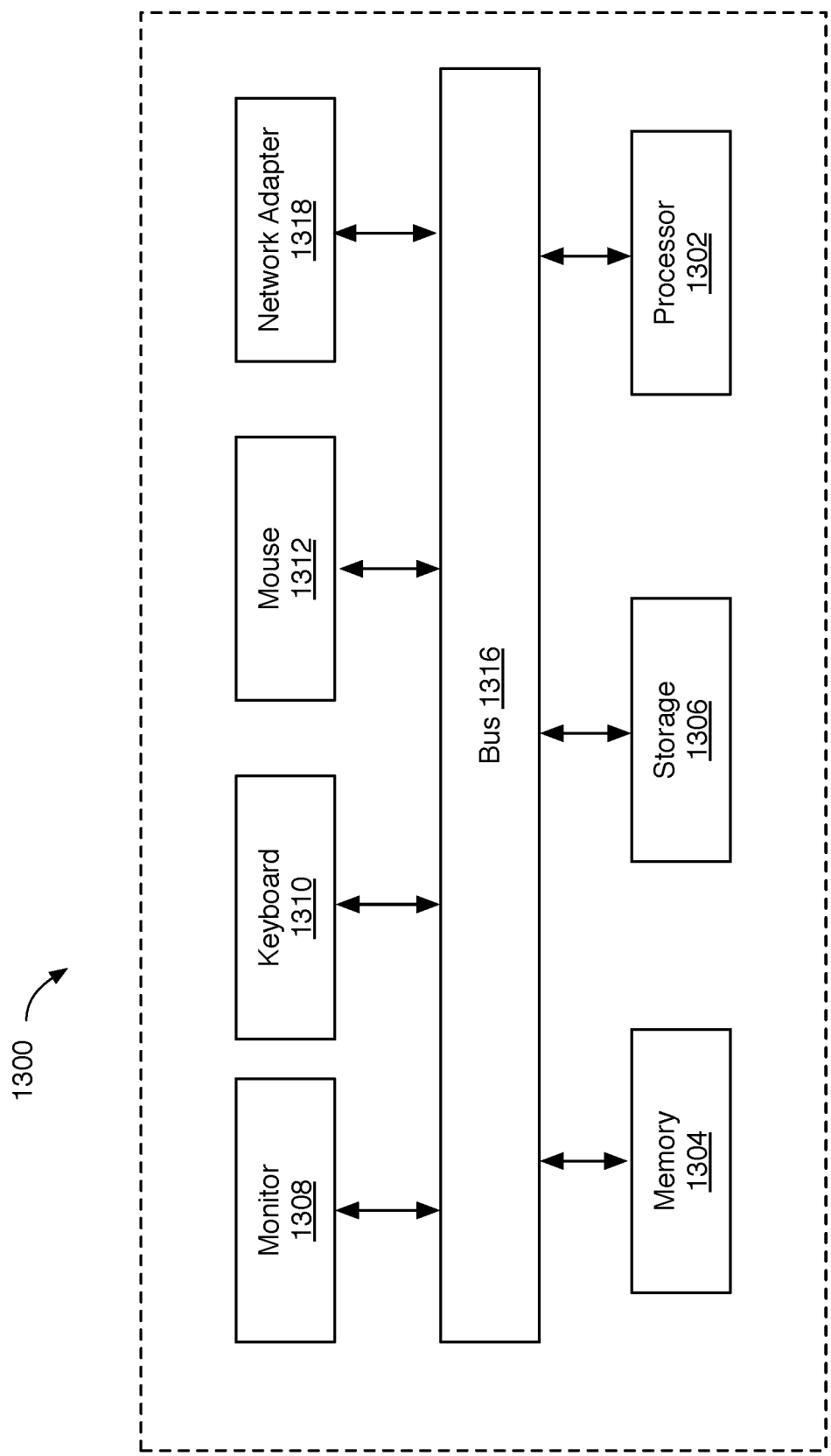
FIG. 13 illustrates a computing system upon which portions of a peer-group based peer-group based business information system can be implemented.

FIG. 13 illustrates a computing system 1300 upon which portions of the peer-group based business information system 100 can be implemented. The computing system 1300 includes one or more computer processor(s) 1302, associated memory 1304 (e.g., random access memory (RAM), cache memory, flash memory, etc.), one or more storage device(s) 1306 (e.g., a hard disk, an optical drive such as a compact disk (CD) drive or digital versatile disk (DVD) drive, a flash memory stick, etc.), a bus 1316, and numerous other elements and functionalities. The computer processor (s) 1302 may be an integrated circuit for processing instructions. For example, the computer processor(s) may be one or more cores or micro-cores of a processor. The computing system 1300 may also include one or more input device(s), e.g., a touchscreen, keyboard 1310, mouse 1312, microphone, touchpad, electronic pen, or any other type of input device. Further, the computing system 1300 may include one or more monitor device(s) 1308, such as a screen (e.g., a liquid crystal display (LCD), a plasma display, touchscreen, cathode ray tube (CRT) monitor, projector, or other display device), external storage, input for an electric instrument, or any other output device. The computing system 1300 may be connected to, e.g., a local area network (LAN), a wide area network (WAN) such as the Internet, mobile network, or any other type of network) via a network adapter 1318.

While the foregoing disclosure sets forth various embodiments using specific diagrams, flowcharts, and examples, each diagram component, flowchart step, operation, and/or component described and/or illustrated herein may be implemented, individually and/or collectively, using a range of processes and components.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While the invention has been described with respect to a limited number of embodiments, those skilled in the art, having benefit of this disclosure, will appreciate that other embodiments may be devised which do not depart from the scope of the invention as disclosed herein.

What is claimed is:

1. A computer-implemented method for peer-group identification and analysis, comprising:
    identifying a peer group cluster of business entities from online information pertaining to markets in which businesses currently compete, comprising:
        gathering a set of information pertaining to one or business markets of one or more of business entities from one or more online resources;
        extracting, using a natural language processor, one or more markets in which a business current operates, comprising one or more words, from the gathered information that pertain to one or more of the markets in which the business entities participate;
        normalizing one or more of the markets to facilitate the comparison of the markets by a peer-group analyzer, wherein the normalizing identifies different wordings for markets that refer to the same thing;
        assigning a tag to each market such that the tags are selected to enable a comparison of the markets;
        storing the assigned tags and the set of markets as sets of curated market information for each set of business entities, wherein each set of curated market information enables a determination of one or more markets in which the corresponding business entity currently operates;
    selecting a subset of the business entities to define a peer-group cluster for a market in response to the curated market information by identifying which ones of the business entities have matching tags such that the business entities specified in the peer-group cluster share at least one competitive overlap in one or more of the markets; providing a user with a relative comparison of the business entities specified in the peer-group cluster by generating a user interface on a client device of the user that enables the user to browse the business entities from the client device and view the relative comparison on the device wherein a performance ranker provides the user with the relative comparison in response from a request from the user that identifies one or more of the business entities,
    in response to the relative comparison, obtaining from the user, a feedback pertaining to one or more of the business entities identified in the peer-group cluster from the user and removing the one or more business entities from the peer-group cluster in response to the feedback,
    filtering the feedback using crowd-sourcing before applying the removal to the peer group cluster; and
    providing a visual presentation of a relative comparison of the revised peer group cluster, revised by the removal of the one or more business entities for which the user provided the feedback and which was filtered to confirm the removal from the peer group cluster.

2. The method of claim 1, wherein providing a user with a relative comparison comprises providing a performance of each business entity specified in the peer-group cluster in one or more of the markets.

3. The method of claim 2, further comprising generating a set of curated performance information for each of the business entities and determining the performances of the business entities specified in the peer-group cluster in response to the curated performance information.

4. The method of claim 3, wherein generating a set of curated performance information comprises:
    gathering a set of performance information pertaining to one or more of the business entities from one or more online resources;
    extracting one or more performance values from the performance information that pertain to one or more of the markets; and
    assigning a tag to each performance value such that the tags are selected to enable a comparison of the performance values.

5. The method of claim 4, further comprising normalizing one or more of the performance values to facilitate the comparison of the performance values.

6. The method of claim 1, further comprising assigning one or more industry value drivers to the peer-group cluster and determining the relative comparison in response to the industry value drivers.

7. The method of claim 1 further comprising providing in the relative comparison that is visually displayed and option to select to provide feedback that one of the business entities should be removed from the defined peer group cluster and also provide an option to manage which business entities in the peer group are to be part of the relative comparison by adding or removing from the relative comparison.

\* \* \* \* \*